United States Patent [19]
Pavone

[11] Patent Number: 5,875,625
[45] Date of Patent: Mar. 2, 1999

[54] FRUIT CATCHER

[76] Inventor: Osvaldo Pavone, 112 Valera Drive, Stoney Creek, Ontario, Canada, L8E 4T6

[21] Appl. No.: 917,783

[22] Filed: Aug. 27, 1997

[51] Int. Cl.⁶ .................................................... A01D 46/22
[52] U.S. Cl. ............................................. 56/329; 56/328.1
[58] Field of Search ................................... 56/329, 328.1, 56/340.1

[56] References Cited

U.S. PATENT DOCUMENTS

| | | |
|---|---|---|
| 1,132,325 | 3/1915 | Fountain et al. . |
| 3,240,004 | 3/1966 | Müller . |
| 3,407,585 | 10/1968 | Poehlmann . |
| 3,596,455 | 8/1971 | Adrian . |
| 3,698,170 | 10/1972 | Kenrick ...................................... 46/329 |
| 4,269,021 | 5/1981 | Friday ........................................ 56/329 |
| 4,545,187 | 10/1985 | Landgraf . |
| 5,123,238 | 6/1992 | Renchan . |
| 5,191,758 | 3/1993 | Cote . |

Primary Examiner—Heather Shackelford
Attorney, Agent, or Firm—Rogers & Scott

[57] ABSTRACT

A fruit catcher has a trolley with ground-engaging wheels to enable the catcher to be moved over the ground, and a pair of side-by-side catcher portions pivotally mounted on the trolley for lateral opening and closing movement to enable the trolley to be moved, when the catcher portions are in a laterally opened position, to position the catcher portions on opposite sides of a tree, whereby the catcher portions can subsequently be pivoted to a closed position in which the catcher portions surround the tree. Each catcher portion has a series of radial arms which are extendable and contractible and which carry a flexible catcher sheet portion. Each catcher portion also has an actuator connected to each radial arm thereof for extending and contracting the arms simultaneously and, when the arms are extended, the flexible sheet portions provide an annular catcher array surrounding the tree for catching fruit falling therefrom.

5 Claims, 3 Drawing Sheets

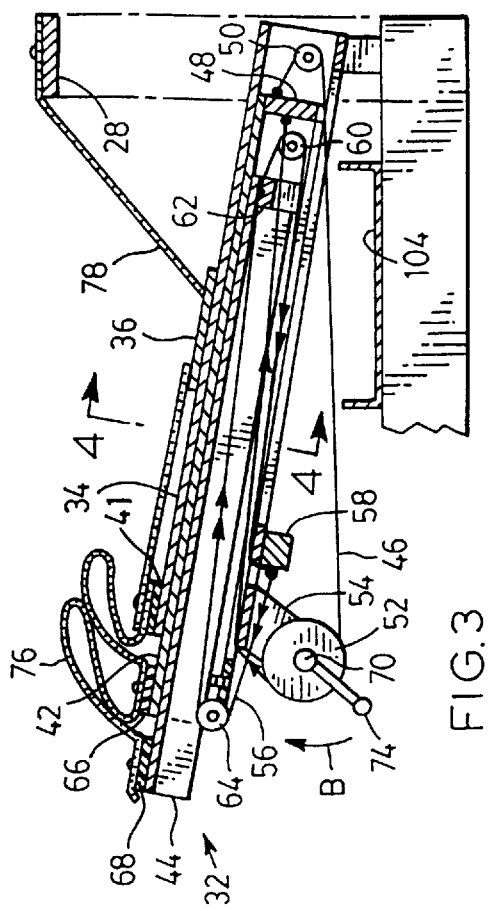
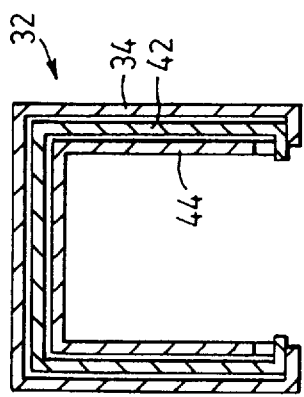
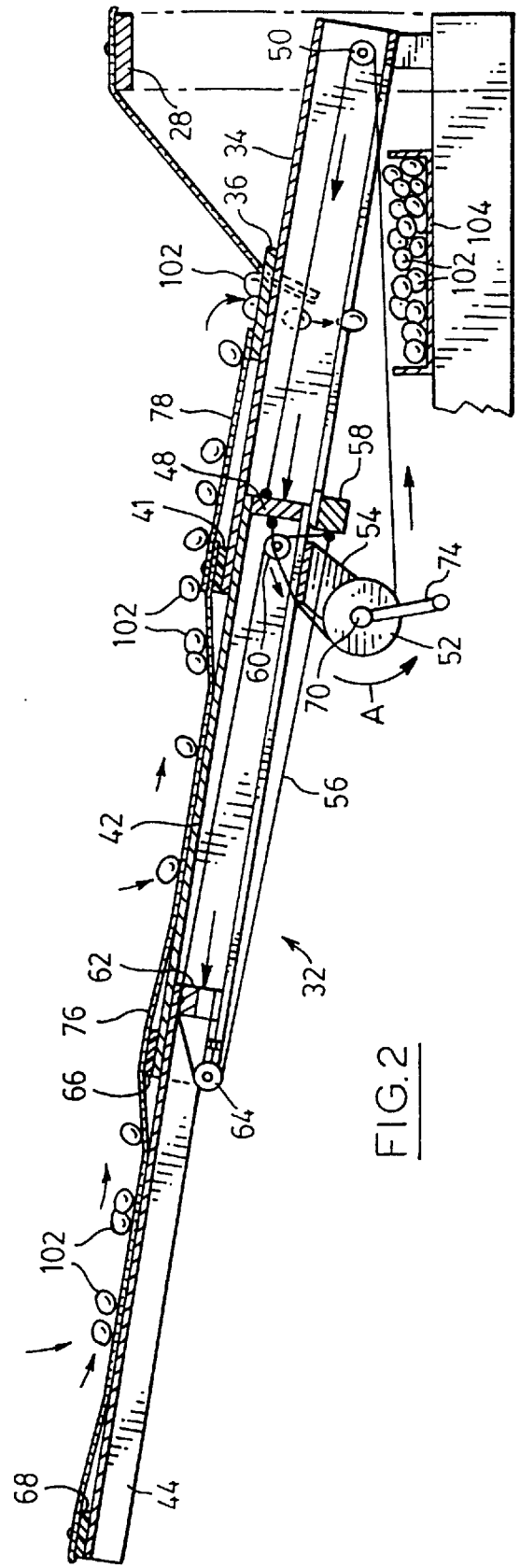
FIG.3
FIG.4
FIG.2

FRUIT CATCHER

FIELD OF THE INVENTION

This invention relates to fruit catchers.

BACKGROUND OF THE INVENTION

In the past, there have been various proposals for fruit catchers which are positionable under a tree to catch fruit falling therefrom. However, for one reason or another, such previously known fruit catchers have not proved to be particularly satisfactory.

It is therefore an object of the present invention to provide an improved fruit catcher of this kind.

SUMMARY OF THE INVENTION

According to the present invention, a fruit catcher has a trolley with ground-engaging wheels to enable the catcher to be moved over the ground, and a pair of side-by-side catcher portions pivotally mounted on the trolley for lateral opening and closing movement to enable the trolley to be moved, when the catcher portions are in the laterally open position, to position the catcher portions on opposite sides of a tree, whereby the catcher portions can subsequently be pivoted to a closed position in which the catcher portions surround the tree. Each catcher portion has a series of radial arms which are extendable and contractible and which carry a flexible catcher sheet portion. Each catcher portion also has an actuator connected to each radial arm thereof for extending and contracting the arms simultaneously. When the arms are extended, the flexible sheet portions provide an annular catcher array surrounding the tree for catching fruit falling therefrom.

Each catcher arm may have a first arm portion fixedly secured to the catcher portion, and a second arm portion extendable and retractable relative to the first arm portion to extend and contract the arm, and a first flexible elongated pulling element having opposite ends connected to the second arm portion and passing around a rotatable spool secured in position on the first arm portion, and the actuator being operable to rotate each spool of a catcher portion to simultaneously extend or retract the second arm portions relative to the first arm portions of the arms thereof, the flexible catcher sheet portions being secured to both the first arm portions and the second arm portions of the arms of the catcher portion.

Each catcher arm may also have a third arm portion extendable and contractible relative to the second arm portion, and a second flexible elongated pulling element having opposite ends connected to the first arm portion and passing around at least one guide on the second arm portion, said second flexible pulling element also being secured to the third arm portion, whereby extending and retracting movement of the second arm portion relative to the first arm portion also causes similar movement of the third arm portion relative to the second arm portion, the flexible catcher sheet portion also being secured to the third arm portion.

The actuator may include a rotatable articulated linkage extending around each catcher portion and upon which each spool of the catcher portion is mounted for rotation therewith.

The arms may extend radially in an upwardly inclined direction whereby fruit falling on the flexible sheet portions carried thereby moves inwardly down the flexible sheet portions, the catcher also having apertures through which the fruit subsequently falls for subsequent collection.

BRIEF DESCRIPTION OF DRAWINGS

Embodiments of the invention will now be described, by way of example, with reference to the accompanying drawings, of which:

FIG. 2 is a sectional side view of one of the radially extendable arms of the fruit catcher of FIG. 1 in its fully extended position, FIG. 3 is a similar view to FIG. 2 but showing the arm in its fully retracted position, FIG. 4 is a sectional view of the arm taken along the line 4—4 of FIG. 3.

DESCRIPTION OF PREFERRED EMBODIMENT

Figure 1:
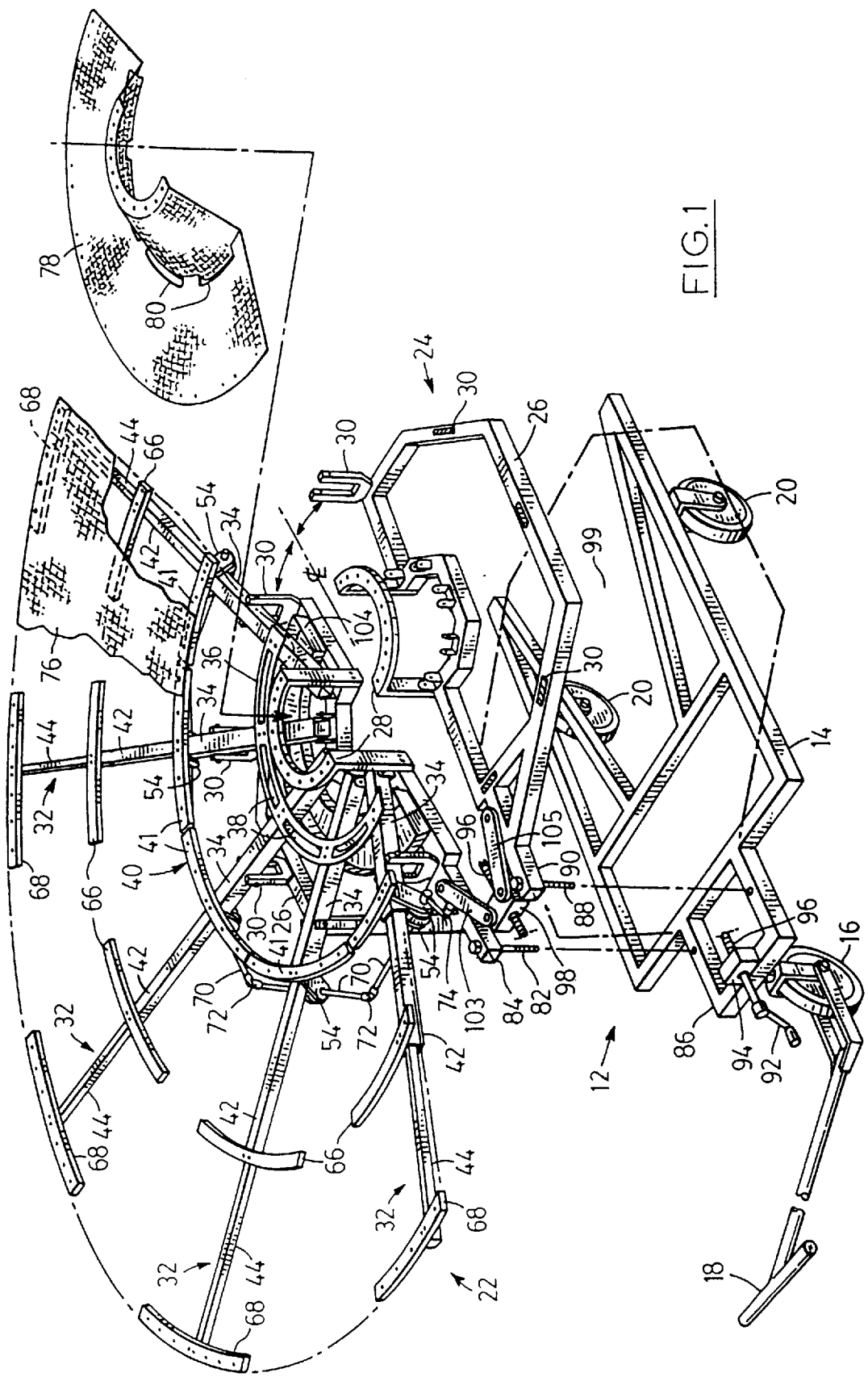
FIG. 1 is a perspective exploded view of a fruit catcher, with various parts being omitted for clarity.

Referring to the drawings, a fruit catcher has a trolley 12 with a main frame 14 supported by a ground-engaging front wheel 16 which is manually steerable by a handle 18 and a pair of ground-engaging rear wheels 20. A pair of semi-circular catcher portions 22, 24 are pivotally mounted side-by-side on the trolley 12. For ease of explanation, only the catcher portion 22 will be described in detail, and it will be understood that the catcher portion 24 is constructed and operates in a similar manner to the catcher portion 22.

The catcher portion 22 has a frame 26 of generally semi-circular shape and a semi-circular tree-receiving portion 28. The frame 26 carries uprights 30 which support the radially outer ends of first arm portions 34 of radially extendable and contractible arms 32 which extend radially outwardly in a slightly upwardly inclined direction. The radially inner ends of the first arm portions 34 are secured in any suitable manner to the tree receiving portion 28 of the frame 26. The catcher portion 22 also has an inner arcuate member 36 mounted on top the first arm portions 34 a short distance radially outwardly of the tree-receiving portion 28. The inner arcuate member 36 has slots 38 between each adjacent pair of first arm portions 34 for a purpose which will be described later. Catcher portion 22 also has an outer arcuate member 40 mounted on top of the first arm portions 34 at their radially outer ends, again for a purpose which will be described later. As shown, the outer arcuate member 40 is actually formed by a series of arcuate portions 41.

One of the radially extendable and contractible arms 32 will now be described with particular reference to FIGS. 2 to 4. The first arm portion 34 is fixedly secured to the catcher portion 22 as previously described. A second arm portion 42 is slidably mounted within the first arm portion 34, and a third arm portion 44 is slidably mounted within the second arm portion 42. A first flexible elongated pulling element in the form of a first wire 46 has a first end secured to an anchor block 48 at the rear end of the second arm portion 42. The first wire 46 extends rearwardly from the anchor block 48 around a rotatable pulley 50 mounted in the rear end of the first arm portion 34 and then extends forwardly to pass around a rotatable spool 52 mounted between two mounting plates 54 which are attached to and extend downwardly from the first arm portion 34 at its front end. After passing around the spool 52, the first wire 46 passes through the interior of the first arm portion 34 to the anchor block 48 and to which the opposite end of the first wire 46 is secured. The spool 52 has helical grooves (not shown) in its surface, and the first wire 46 is seated in these grooves to ensure that, when the spool 52 is rotated, the first wire 46 is moved in one direction or the other, as will be described later.

A second flexible elongated pulling element in the form of a second wire 56 has its opposite ends secured to an anchor block 58 mounted on the bottom of the first arm portion 34 near the spool mounting plates 54. From the anchor block 58, the second wire 56 passes around a rotatable pulley 60 mounted in the rear end of the second arm portion 42, and then extends forwardly through an anchor block 62 mounted in the rear end of the third arm portion 44. The second wire 56 is secured to the anchor block 62 in a suitable manner, for example by a grub screw (not shown). The second wire 56 then extends forwardly from the anchor block 62 and passes around a rotatable roller 64 mounted at the front end of the second arm portion 42 to then extend rearwardly back to the anchor block 58.

The radially outer end of the second arm portion 42 carries an arcuate member 66, and the radially outer end of the third arm portion 44 carries an arcuate member 68 for a purpose which will be described later.

Each spool 52 is mounted on a short shaft 70, and the shafts 70 of each pair of adjacent spools 52 are connected by an articulated linkage 72. The shaft 70 of the spool 52 nearest the front end of the trolley 12 carries a manually operable handle 74 which, when rotated, rotates all the spools 52 of the catcher portion 22 as a result of their interconnection by the articulated linkages 72. Movement of the first wire 46 caused by rotation of the spools 52 in an anti-clockwise direction, as indicated by the arrow A in FIG. 2, causes the second arm portion 42 to be extended from the first arm portion 34. Such movement of the second arm portion 42 causes the second wire 56 to cause the third arm portion 44 to be extended from the second arm portion 42. FIG. 2 shows the arm portions 42, 44 in their fully extended positions. Similarly, when the spools 52 are then rotated by the handles 74 in the clockwise direction, as indicated by the arrow B in FIG. 3, the first wire 46 retracts the second arm portion 42 back into the first arm portion 34, and the second wire 56 retracts the third arm portion 44 back into the second arm portion 42.

Figure 5:
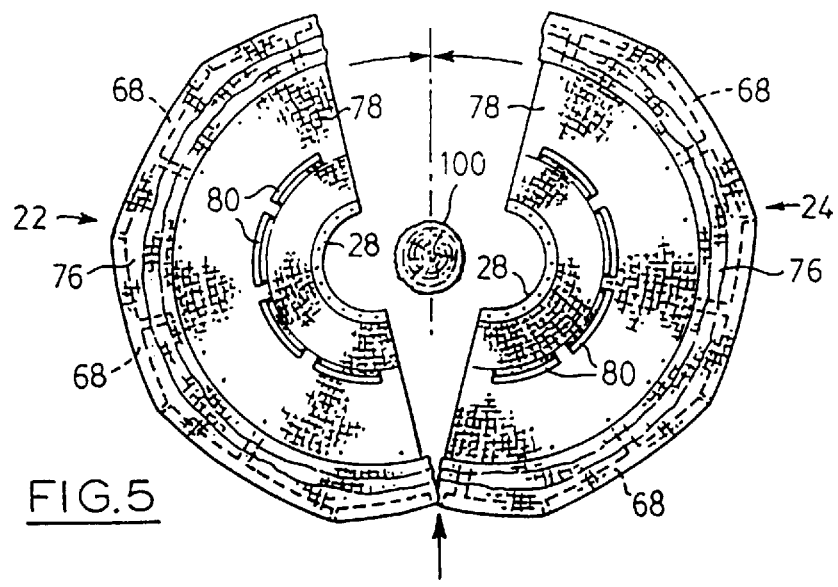
FIG. 5 is a diagrammatic top view (with the trolley omitted) of the catcher being positioned around a tree with the radial arms and catcher sheet in the fully contracted condition.
Figure 6:
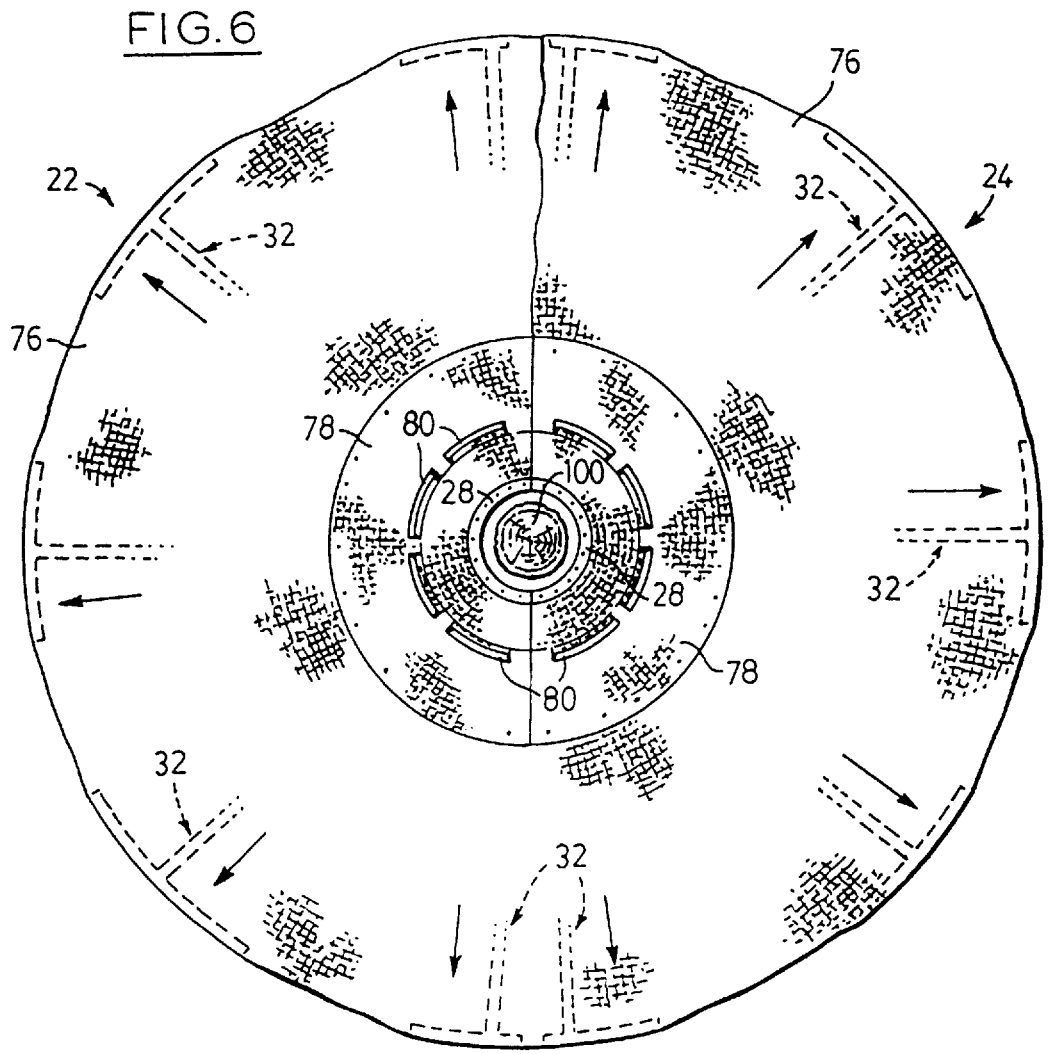
FIG. 6 is a similar view showing the catcher in position around the tree with the radial arms and the catcher sheet fully extended.

Referring now to FIGS. 5 and 6, the catcher portion 22 also has an arcuate catcher sheet 76. The radially inner edge of the catcher sheet 76 is secured to the arcuate members 41 mounted on the radially outer ends of the first arm portions 34, a radially medial portion of the catcher sheet 76 is secured to the arcuate members 66 mounted on the radially outer ends of the second arm portions 42, and the radially outer edge of the catcher sheet 76 secured to the arcuate members 68 mounted on the ends of the third arm portions 44.

The catcher portion 22 also has a semi-circular catcher sheet 78 with a radially inner edge secured to the top of the tree receiving portion 28, a radially medial portion secured to the arcuate members 36, and a radially outer edge secured to the arcuate members 41 on the radially outer ends of the first arm portions 34. The radially medial portion of the semi-circular catcher sheet 78 has arcuate slots 80 which are aligned with the slots 38 in the arcuate members 36.

It has been previously mentioned that the catcher portion 22 is pivotally mounted on the trolley 14. As shown in FIG. 1, a pivot pin 82 extends through a front end portion 84 of the catcher portion 22 into a front end portion 86 of the trolley 14 adjacent the front wheel 16. Similarly, a pivot pin 88 extends through a front end portion 90 of the catcher portion 24 into the front end portion 86 of the trolley 14. The two catcher portions 22, 24 can be simultaneously pivoted in a horizontal direction towards and away from each other by a single pivoting rotatable handle 92 mounted in a block 94 carried by the front end portion 86 of the trolley 14. The handle 92 has a threaded rear portion 96 which extends into a threaded aperture in an adjustment block 98. Two links 103, 105 are pivotally connected at one end to the adjustment block 98 and are pivotally connected at their other ends to the frames 26 of the catcher portions 22, 24 respectively.

In use, the catcher is manually moved to a position adjacent a fruit tree, for example an olive tree. At this stage, the catcher portions 22, 24 are adjacent each other, and the extendable arms 32 of each catcher portion 22, 24 are in the fully contracted position. The pivoting handle 92 is rotated to cause the catcher portions 22, 24 to pivot about the pivot pins 82, 88 respectively to the position shown in FIG. 5. The catcher is then pushed rearwardly towards the olive tree 100 until the tree receiving portions 28 of each catcher portion 22, 24 are in opposite sides of the tree 100. It will be noted that the catcher frame 14 has a rearwardly open recess 99 to receive the tree 100. The pivoting handle 92 is then rotated in the opposite direction to bring the two catcher portions 22, 24 together around the tree 100.

The handles 74 of each catcher portion 22, 24 are then rotated to fully extend the arms 32 as indicated in FIG. 1, thereby extending the catcher sheets 76 to their fullest extent as indicated in FIG. 6. The olives 102 on the tree 100 are then picked in any suitable manner and allowed to fall onto the catcher, where they land on the catcher sheet 76. Since the arms 32 are upwardly inclined, as show in FIGS. 2 and 3, the olives 102 roll down the outer catcher sheet 76 to the inner catcher sheet 78 and through the slots 80 and 36 into an appropriate container 104 below the slots 80.

When all the olives have been picked from the tree, the handles 74 are rotated in the opposite direction from before to contract the arms 32, and the handle 92 is rotated to separate the two catcher portions 22, 24, as indicated in FIG. 5, thereby enabling the catcher to be moved to another location.

The advantages of the invention will be readily apparent to a person skilled in the art from the foregoing description of a preferred embodiment. Other advantages of the invention will also be readily apparent, the scope of the invention being defined in the appended claims.

I claim:

1. A fruit catcher having:
   a trolley with ground-engaging wheels to enable the catcher to be moved over the ground,
   a pair of side-by-side catcher portions pivotally mounted on the trolley for lateral opening and closing movement to enable the trolley to be moved, when the catcher portions are in a laterally opened position, to position the catcher portions on opposite sides of a tree, whereby the catcher portions can subsequently be pivoted to a closed position in which the catcher portions surround the tree,
   each catcher portion having a series of radial arms which are extendable and contractible and which carry a flexible catcher sheet portion,
   each catcher portion also having an actuator for simultaneously extending and contracting each radial arm thereof, and
   the flexible sheet portions, when the arms are extended, providing an annular catcher array surrounding the tree for catching fruit falling therefrom.

2. A fruit catcher according to claim 1 wherein each catcher arm has a first arm portion fixedly secured to the catcher portion, and a second arm portion extendable and retractable relative to the first arm portion to extend and contract the arm, and a first flexible elongated pulling element having opposite ends connected to the second arm portion and passing around a rotatable spool secured in position on the first arm portion, and the actuator being operable to rotate each spool of a catcher portion to simultaneously extend or retract the second arm portions relative to the first arm portions of the arms thereof, the flexible catcher sheet portion being secured to both the first arm portions and the second arm portions of the arms of the catcher portion.

3. A fruit catcher according to claim 2 wherein each catcher arm also has a third arm portion extendable and contractible relative to the second arm portion, and a second flexible elongated pulling element having opposite ends connected to the first arm portion and passing around at least one guide on the second arm portion, said second flexible pulling element also being secured to the third arm portion, whereby extending and retracting movement of the second arm portion relative to the first arm portion also causes similar movement of the third arm portion relative to the second arm portion, the flexible catcher sheet portion also being secured to the third arm portion.

4. A fruit catcher according to claim 2 wherein the actuator includes a rotatable articulated linkage extending around each catcher portion and upon which each spool of the catcher portion is mounted for rotation therewith.

5. A fruit catcher according to claim 1 wherein the arms extend radially in an upwardly inclined direction whereby fruit falling on the flexible sheet portions carried thereby moves radially inwardly down the flexible sheet portions, the catcher also having apertures through which the fruit subsequently falls for subsequent collection.

\* \* \* \* \*